United States Patent
Oshidari

(10) Patent No.: US 6,179,744 B1
(45) Date of Patent: Jan. 30, 2001

(54) TRUNNION SUPPORTING STRUCTURE OF A TOROIDAL CONTINUOUSLY VARIABLE TRANSMISSION

(75) Inventor: Toshikazu Oshidari, Kanagawa (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/163,356

(22) Filed: Sep. 30, 1998

(30) Foreign Application Priority Data

Sep. 30, 1997 (JP) .................................................. 9-265479

(51) Int. Cl.[7] .................................................. F16H 15/38
(52) U.S. Cl. .............................. 476/46; 384/127; 384/903
(58) Field of Search .................................. 384/903, 561, 384/570, 538, 127; 476/46, 40, 10, 8, 42

(56) References Cited

U.S. PATENT DOCUMENTS

| | | | |
|---|---|---|---|
| 4,968,289 | * 11/1990 | Nakano | 476/41 |
| 5,187,995 | * 2/1993 | Nakano | 476/10 |
| 5,885,185 | * 3/1999 | Kidokoro et al. | 476/10 |
| 5,893,815 | * 4/1999 | Nakano | 476/40 |

FOREIGN PATENT DOCUMENTS 57-47060   3/1982 (JP) .

OTHER PUBLICATIONS

Nakano et al.; "Dynamic Characteristics of Speed Ratio Control of the Halt Toroidal CVT for Passenger Cars"; The Engineering Society for Advancing Mobility Land Sea Air and Space; Sep. 1990; pp. 24–32.

* cited by examiner

Primary Examiner—David M. Fenstermacher
(74) Attorney, Agent, or Firm—Foley & Lardner

(57) ABSTRACT

Plural trunnions of a toroidal continuously variable transmission are joined by a link so as to synchronize the axial displacement of the trunnions. A needle bearing and a spherical joint are interposed between the trunnions and link to permit rotation of the trunnions and inclination within a small range thereof. When the needle bearing is inclined with respect to the trunnion, an axial force acts on the trunnion as it rotates. A member is therefore provided which prevents the relative inclination of an inner contact member and an outer contact member of the needle bearing in order to prevent such an axial force from acting on the trunnion.

13 Claims, 6 Drawing Sheets

TRUNNION SUPPORTING STRUCTURE OF A TOROIDAL CONTINUOUSLY VARIABLE TRANSMISSION

FIELD OF THE INVENTION

This invention relates to a trunnion support for supporting a power roller of a toroidal continuously variable transmission.

BACKGROUND OF THE INVENTION

In a toroidal continuously variable transmission, power rollers are supported by trunnions as disclosed for example by Tokkai Sho 57-47060 published by the Japanese Patent Office in 1982. A piston is fixed to these trunnions respectively. When a piston is driven hydraulically and the trunnions are displaced at right angles to a rotation shaft of an input disk and output disk, the gyration angle of the power roller varies, and a rotation ratio (drive ratio) of the input disk and output disk holding the power rollers varies.

The upper ends and lower ends of these trunnions are respectively fitted to a link so that they can displace in synchronism. Each trunnion is joined to the link via a needle bearing and a spherical joint so as to permit it to rotate freely and incline through a very small range.

When the power roller is inclined, a load acts on the trunnion in a direction other than the anal direction.

This load is absorbed by the relative displacement of the spherical joint and a link. Since there is a small clearance between the needle bearing and the trunnion and between the needles, some needles may incline relative to the trunnion in this case. The inclined needles, however, exert an axial force on the trunnion when it rotates. According to an analysis, about 10% of the force of a radial load supported by the needle bearing acts on the trunnion in the axial direction.

As a result, there is an excess or deficiency of the drive force exerted by the piston on the trunnion, and this results in scatter of torque transmitted by the power rollers.

SUMMARY OF THE INVENTION

It is therefore an object of this invention to prevent the inclined needles from exerting an external force on the trunnion.

In order to achieve the above object, this invention provides a trunnion supporting structure of a continuously variable transmission. The transmission comprises an input disk and output disk arranged facing each other on a rotation axis, power rollers for transmitting a torque between the disks, trunnions supporting the power rollers, and a link connecting the trunnions, wherein a gyration angle of the power rollers is varied by driving the trunnions along a trunnion axis at right angles to the rotation axis.

The supporting structure comprises a needle bearing, a spherical joint, a first member, a second member and a third member.

The needle bearing comprises plural rolling pasts which roll along a circular path. The first member is disposed inside, the circular path and the second member is disposed outside the circular path. The needle bearing allows relative rotation between the first member and the second member. The third member prevents the relative inclination of the first member and the second member.

It is preferable that the trunnion comprises a shoulder part extending at right angles to the trunnion axis, the first member is the trunnion, the second member is the spherical joint, the third member is supported by the trunnion, and the spherical joint is fitted between the shoulder part and the third member such that a displacement of the spherical joint in a direction of the trunnion axis is limited by the shoulder part and the third member.

It is further preferable that the spherical joint is fitted in a throughole formed in the link.

It is also preferable that the third member comprises an annular retainer supported via a snap ring fitted to the trunnion.

In this case, It is further preferable that the supporting structure further comprises a spacer filling a gap between the shoulder part and the spherical joint.

When the spacer is provided, it is further preferable that a contact area between the spacer and the shoulder part is set larger than a contact area between the spacer and the spherical joint.

It is also preferable that the supporting structure further comprises a spring interposed between the snap ring and the retainer.

It is also preferable that the third member is a nut which screws into the trunnion, and the supporting structure further comprises a thrust needle bearing interposed between the spherical joint and the shoulder part, and a thrust needle bearing interposed between the spherical joint and the nut.

When the toroidal continuously variable transmission comprises a wire for synchronizing the rotation of the plural trunnions, it is preferable that the third member comprises a pulley supported by the trunnion around which the wire is looped.

In this case, it is further preferable that the supporting structure further comprises a spacer filling a gap between the shoulder part and the spherical joint.

In this case, it is further preferable that a contact area between the spacer and the shoulder part is set larger than a contact area between the spacer and the spherical joint.

It is also preferable that the supporting structure further comprises a spring pushing the pulley towards the spherical joint.

It is also preferable that the pulley is fixed to the trunnion by a nut, and the supporting structure further comprises a thrust needle bearing interposed between the spherical joint and the shoulder part, and a thrust needle bearing interposed between the spherical joint and the pulley.

It is also preferable that the first member comprises a cylindrical member, the second member comprises a wall of a throughole formed in the link, the spherical joint is fitted between an outer circumference of the trunnion and an inner circumference of the cylindrical member, and the third member is supported by the link.

In this case, it is further preferable that the link comprises an anvil part extending into the throughole, the third member comprises an annular retainer supported in the throughole via a snap ring by the link, and the cylindrical member is fitted between die anvil part and the retainer such that a displacement of the cylindrical part in a direction of the trunnion axis is limited by the anvil part and the retainer.

The details as well as other features and advantages of this invention are set forth in the remainder of the specification and are shown in the accompanying drawings.

DESCRIPTION OF THE PREFERRED EMBODIMENTS

Figure 1:
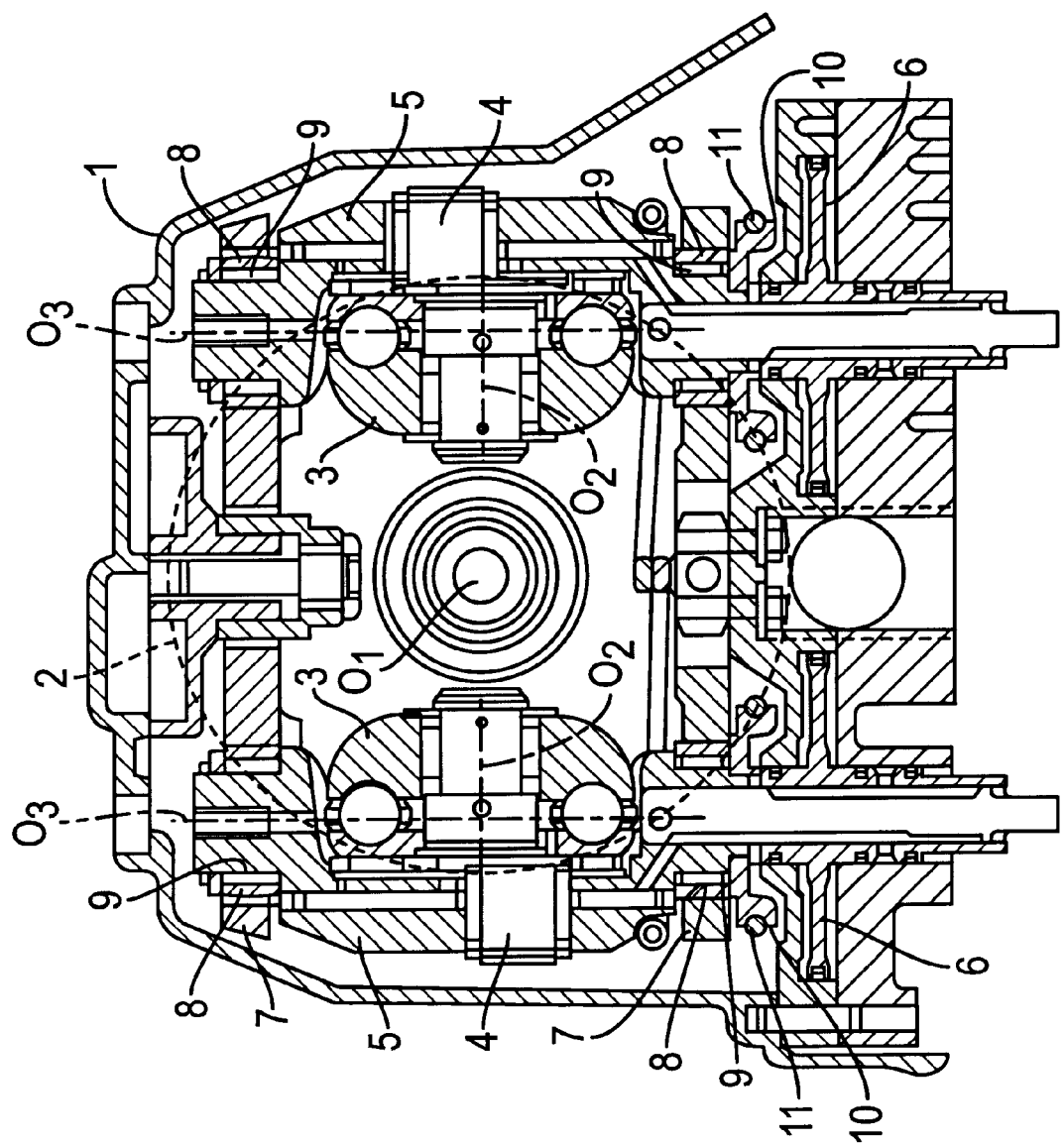
FIG. 1 is a vertical cross-sectional view of a toroidal continuously variable transmission to which this invention is applied.

Referring to FIG. 1 of the drawings, a toroidal type continuously variable transmission is provided with an input disk 2 and output disk which face each other across an axis $O_1$ in a transmission case 1. The output disk is not shown in the diagram.

Two power rollers 3 are gripped between these disks. Each power roller 3 is supported by a trunnion 5 via a pivot shaft 4.

The power roller 3 comes in contact with the input disk 2 and output disk. Due to the frictional force generated between the power roller 3 and these disks, a rotation torque is transmitted from the input disk 2 to the output disk while the power roller rotates about the axis $O_2$.

When the trunnion 5 is displaced by a servo-piston 6 in an upwards direction from a neutral point shown in the figure at which the axes $O_2$ and $O_1$ intersect, the input disk 2 and the output disk exert a rotation load on the power roller 3 so as to rotate it about a trunnion shaft $O_3$, and as a result, the trunnion 5 rotates about the axis $O_3$. In this way, the gyration angle of the power roller 3 varies, and the rotation ratio of the input disk 2 and output disk is made to vary continuously by varying the contact radius with each disk. Such a structure is indicated, for example, by SAE Technical Paper No. 901761.

The upper ends of the trunnions 5 are interconnected by a link 7. The lower ends of the trunnion 5 are interconnected by a different link 7. In this way, the up/down displacements of the trunnions 5 are synchronized.

A pulley 10 is fixed to each trunnion 5 and a synchronizing wire 11 is looped between the pulleys 10 so that the rotational displacement angles of the trunnion 5, that is the inclination angles of the power roller 3, are equal.

The join between the trunnion 5 and link 7 comprises a spherical joint 8 and needle bearing 9. The spherical joint 8 fits into a throughhole in the link 7, and is supported free to incline relative to the link 7 within a predetermined small range.

The needle bearing 9 is interposed between tile spherical joint 8 and trunnion 5, the trunnion 5 being thereby supported free to rotate relative to the spherical joint 8.

Figure 2:
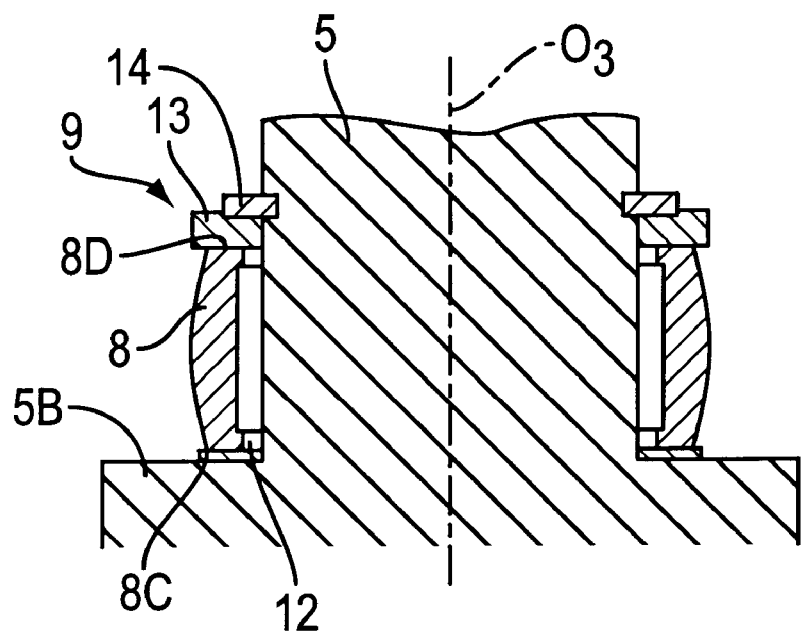
FIG. 2 is a vertical cross-sectional view of a trunnion support unit according to this invention.
Figure 3:
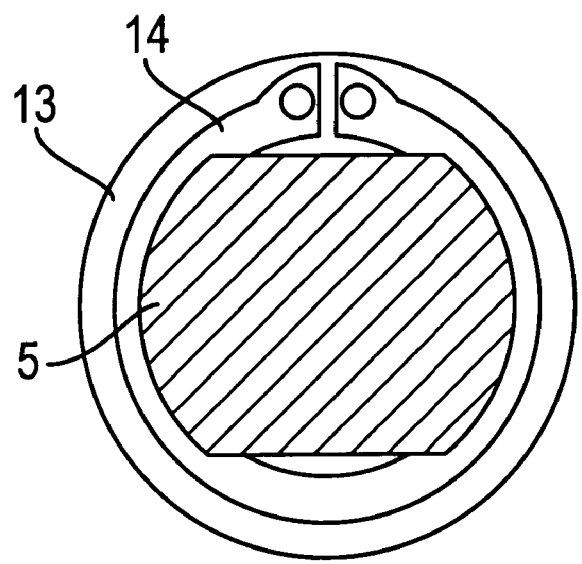
FIG. 3 is a plan view of the trunnion support unit.

According to this invention, the relative displacement in the up/down direction of the spherical joint 8 and trunnion 5 is prevented by a construction such as is shown for example in FIGS. 2 and 3.

Figure 10:
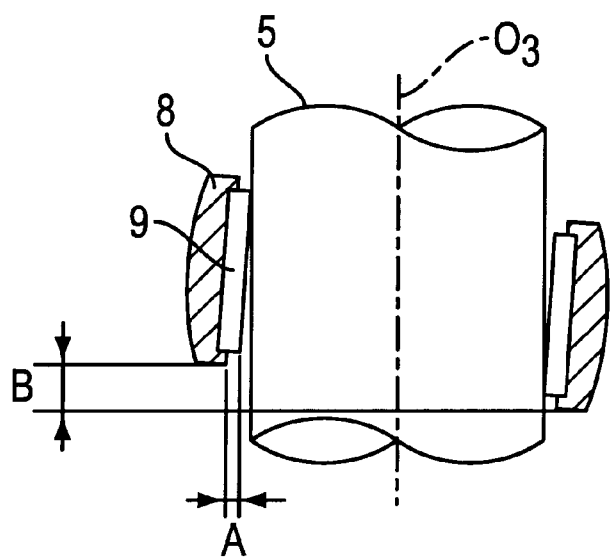
FIG. 10 is a vertical cross-sectional view of a trunnion support unit according to the prior art.

In the prior art, the spherical joint 8 and needle bearing 9 were for example inclined relative to the trunnion 5 within a clearance A between the needle bearing 9 and trunnion 5 as shown in FIG. 10. In other words, the trunnion 5 and the needle bearing 9 could axially displace with each other within the distance B. Within this distance B, the axial force generated by the inclined needles when trunnion 5 rotates, causes the relative displacement of the trunnion 5 and needle bearing 9 without much resistance. However, after it comes to tie state shown in FIG. 10, the relative displacement of the trunnion 5 and needle bearing 9 is locked. If a further axial force is exerted on the trunnion 5 in this state, since the spherical joint 8 can not incline any further a slip may occur between the spherical joint 8 and link 7 so as to enable the further axial displacement of the trunnion 5. Since these parts are not designed to cause slip, much frictional resistance acts on the trunnion 5 as an external force.

This invention prevents this external force from exerting on the trunnion 5, by preventing the relative displacement of the needle bearing 9 and the trunnion 5 in the direction of the axis O3 by a supporting structure shown in FIG. 2. With this prevention, the axial force generated by the inclined needles is supported by this supporting structure and does not bring an external force to the trunnion 5. The prevention of the relative displacement of the needle bearing 9 and the trunnion 5 is realized by preventing the relative displacement of the trunnion 5 and the spherical joint 8 which holds the needle bearing 9.

Describing this supporting structure, a lower end 8C of the spherical joint 8 is supported via a spacer 12 in a shoulder part 5B of the trunnion 5. An upper end 9D of the spherical joint 8 is supported by the trunnion 5 via a retainer 13 and snap ring 14.

By engaging with an annular groove in the trunnion 5 as shown in FIG. 3, the snap ring 14 limits the upward displacement of the annular joint 8 and retainer 13.

The thickness of the spacer 12 is set so that a maximum displacement in an up/down direction of the spherical joint 8 is less than the aforementioned distance B.

Ideally, the vertical displacement of the spherical Joint 8 should be 0, but this is difficult to achieve practically. However, by properly selecting the thickness of the spacer 12, the vertical displacement of the spherical joint 8 can be minimized. In any case, it should be less than the distance B.

In this way, tile up/down displacement of the spherical joint 8 is prevented by the retainer 13 and snap ring 14 and the needle bearing 9 does not exert an external force in the axial direction on the trunnion 5.

Figure 4:
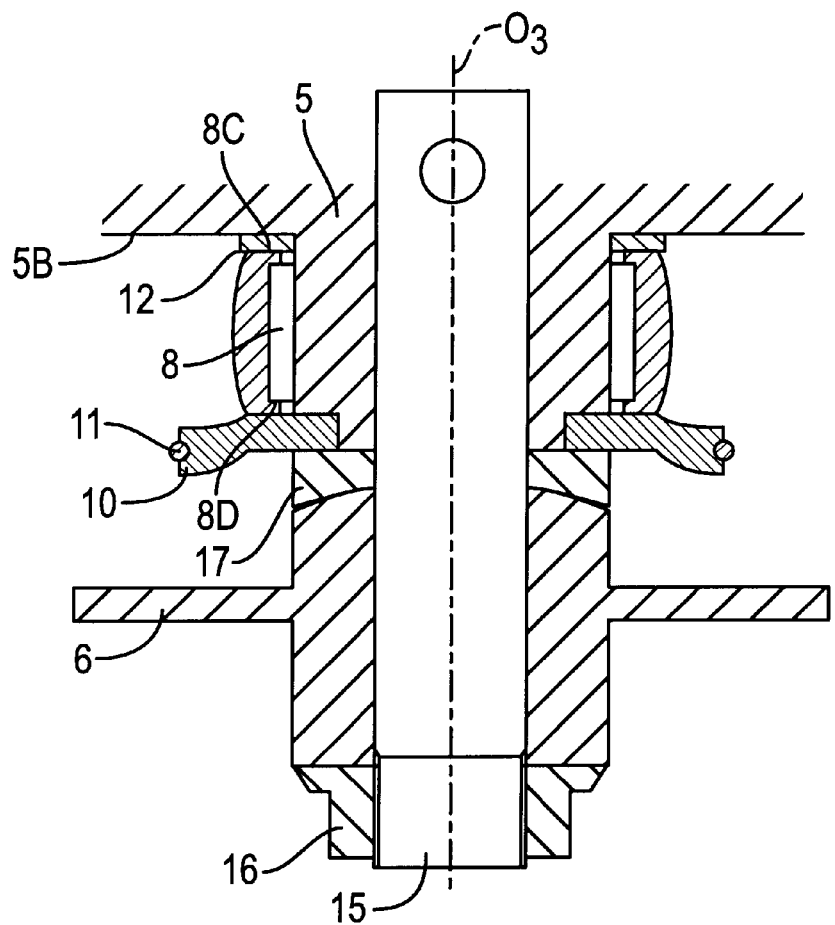
FIG. 4 is a vertical cross-sectional view of a trunnion support unit according to a second embodiment of this invention.

Next, a second embodiment of this invention will be described referring to FIG. 4.

This diagram shows the supporting structure of spherical joint 8 engaged with the lower end of the trunnion 5. Herein, the shoulder unit 5B of the trunnion 5 is located above the spherical joint 8.

The lower end 8D of the spherical joint 8 is supported by the pulley 10. The pulley 10 is fixed to the trunnion 5 together with the servo piston 6 and a washer 17 by a nut 16 which screws into a screw part 15 of the lower end of the trunnion 5.

The spacer 12 is interposed between the upper end 8C of the spherical joint 8 and the shoulder 5B. By selecting the thickness of this spacer 12, the maximum up/down displacement due to inclination of the spherical joint 8 can be minimized, i.e. at least less than B, and the needle bearing 9 is prevented form exerting an external force in the axial direction on the trunnion 5 when it rotates.

According to this embodiment, the spherical joint 8 is gripped by the pulley 10 and shoulder unit 5B, so the retainer and snap ring which were described in the aforesaid first embodiment are unnecessary, therefore the cost can be reduced by a corresponding amount.

Figure 5:
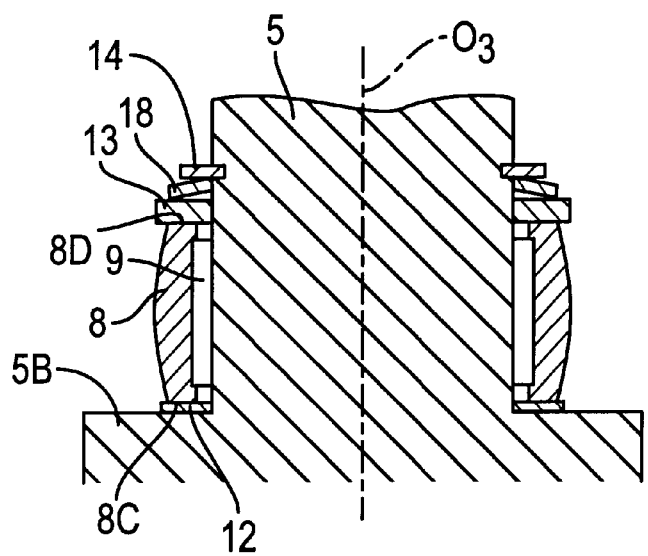
FIG. 5 is similar to FIG. 2, but showing a third embodiment of this invention.

FIG. 5 shows a third embodiment of this invention wherein a plate spring 18 is added between the snap ring 14 and retainer 13 of the aforesaid first embodiment. The spherical joint 8 is constantly pushed towards the shoulder unit 5B by the plate spring 18, and the up/down clearance between the spherical joint and other parts is always zero. Therefore, dimensional variations due to frictional car of parts is absorbed, and the needle bearing 9 is prevented from exerting force on the trunnion 5 for a long period of time.

Figure 6:
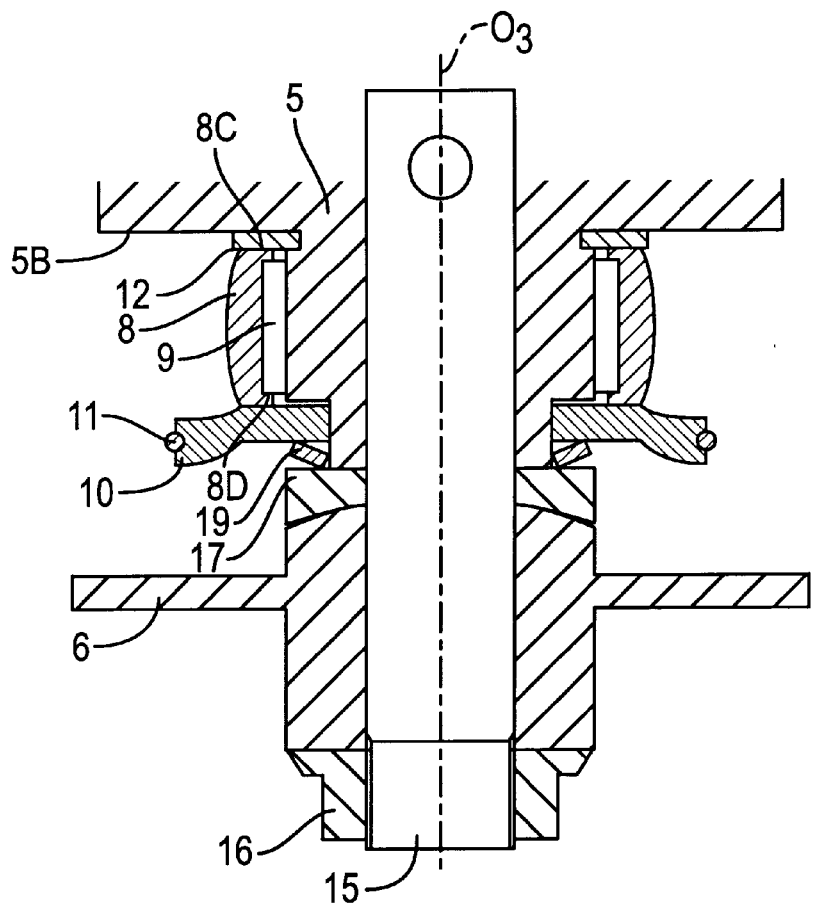
FIG. 6 is similar to FIG. 4, but showing a fourth embodiment of this invention.

FIG. 6 shows a fourth embodiment of this invention wherein a plate spring 19 identical to that of the third embodiment is added between the pulley 10 and washer 17 of the aforesaid second embodiment.

In this embodiment, frictional wear is also absorbed as in the aforesaid third embodiment.

In the aforesaid first embodiment—fourth embodiment, it is preferable that the external diameter of the spacer 12 is set larger than the external diameter of the end of the spherical joint 8 with which the spacer 12 is in contact, and smaller than the maximum diameter of the spherical joint 8. This is in order to make the contact area between the spacer 12 and shoulder unit 5B greater than the contact area between the spacer 12 and spherical joint 8. Due to this setting, relative rotation of the spacer 12 and shoulder unit 5B is prevented and friction frictional wear of the shoulder unit 5B is presented. In this case, the spacer 12 and spherical joint 8 rotate relative to each other due to the rotation of the trunnion 5, and if these parts are constructed of the same hard materials, frictional wear of the spacer 12 and spherical joint 8 due to the relative rotation therebetween is limited to the absolute minimum.

In the first embodiment, it is desirable to provide a stopper between the retainer 13 and snap ring 14 which prevents the relative rotation therebetween. In this way, frictional wear of the snap ring 14 is prevented.

Figure 7:
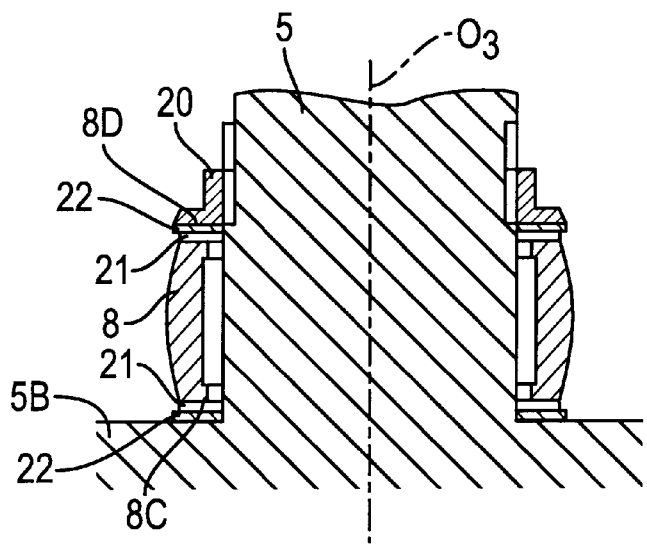
FIG. 7 is similar to FIG. 3, but showing a fifth embodiment of this invention.

FIG. 7 shows a fifth embodiment of this invention. This embodiment shows the supporting structure of the spherical joint 8 engaging with the upper end of trunnion 5.

The upper end 8D and lower end 8C of the spherical joint 8 are respectively supported by thrust needle bearings 21. A washer 22 is interposed between the lower thrust needle bearing 21 and the shoulder part 5B of the trunnion 5 so as to provide a slip surface of the bearing 21.

The upper thrust needle bearing 21 is supported via the washer 22 by a nut 20 which screws into the trunnion 5.

In this supporting structure, the spherical joint 8 is free to rotate due to the thrust needle bearing 21. Therefore, the spherical joint 8 can be tightened in the up/down direction while ensuring relative rotation of the spherical joint 8 and trunnion 5, and prevention of the inclination of the spherical joint 8 and needle bearing 9 can be enhanced.

Figure 8:
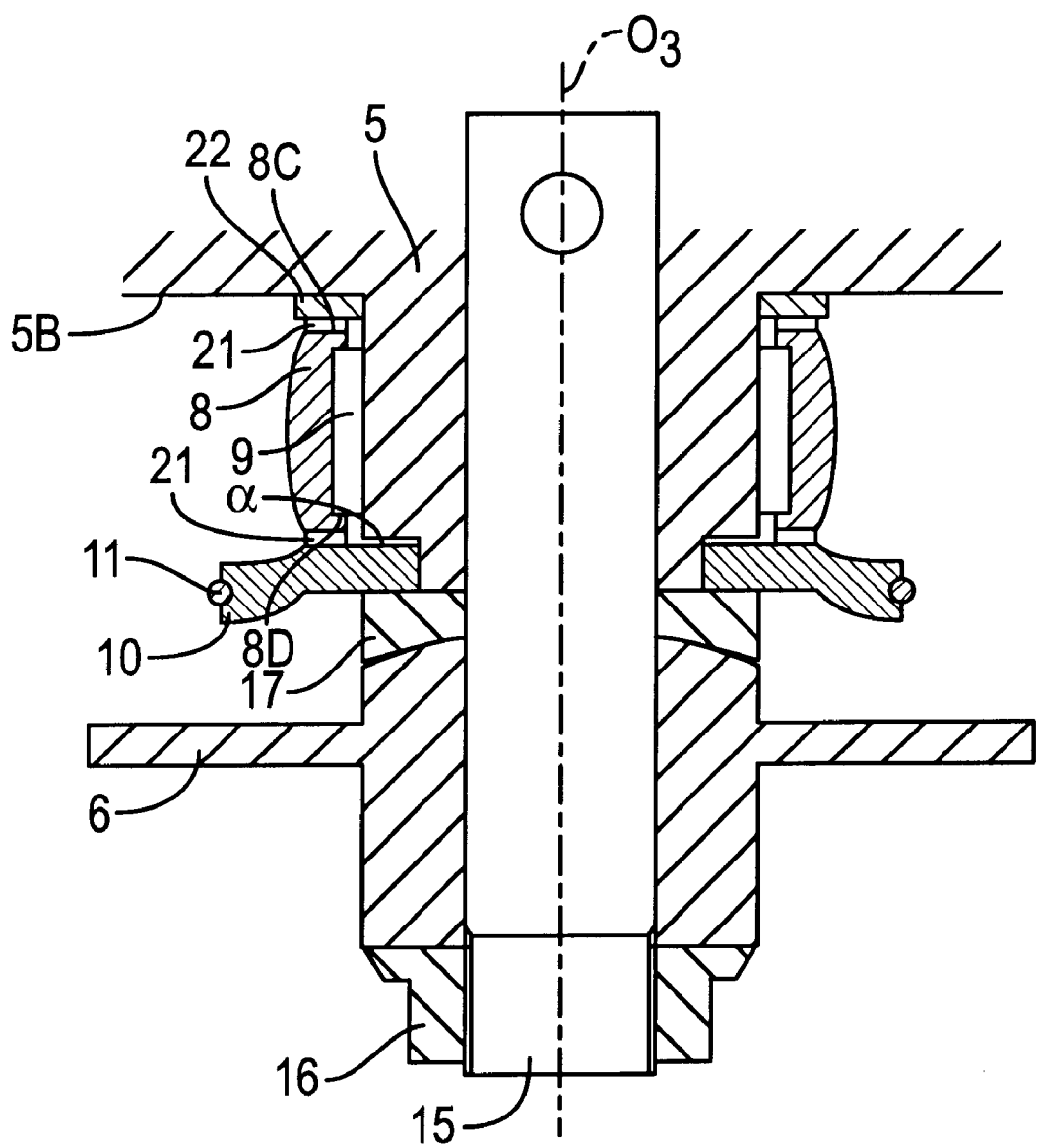
FIG. 8 is similar to FIG. 4, but showing a sixth embodiment of this invention.

FIG. 8 shows a sixth embodiment of this invention wherein an identical thrust needle bearing 21 to that of the aforesaid fifth embodiment is applied to the spherical joint 8 which engages with the lower end of the trunnion 5.

Herein, the spherical joint 8 is gripped via the thrust needle bearing 21 by the shoulder unit 5B of the trunnion 5 and pulley 10. The washer 22 forming a slip surface of the bearing 21 is interposed between the upper thrust needle bearing 21 and shoulder unit 5B.

The pulley 10 is tightened towards the spherical joint 8 by the nut 16. An up/down clearance alpha is however left between the trunnion 5 and the pulley 10. Due to this clearance alpha, the spherical joint 8 is supported without leaving a gap between the shoulder unit 5B and pulley 10.

According to this embodiment, prevention of the inclination of the spherical joint 8 and needle bearing 9 can also be enhanced as in the aforesaid fifth embodiment.

Figure 9:
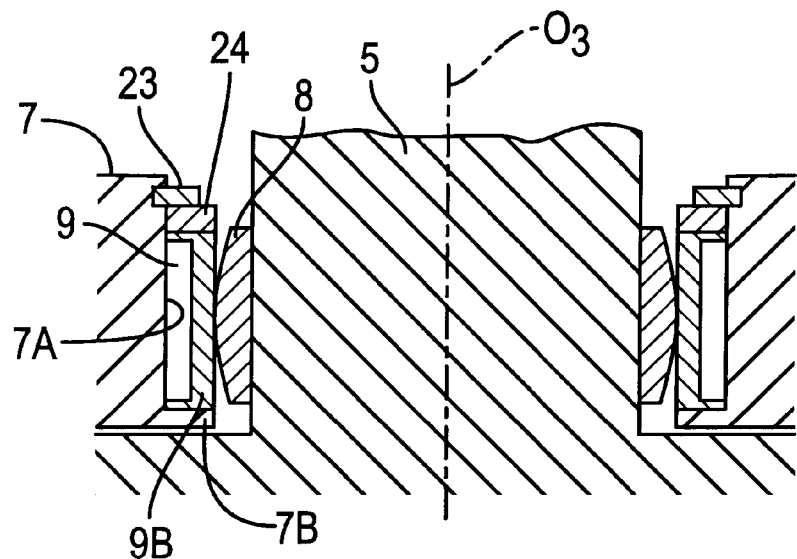
FIG. 9 is a vertical cross-sectional view of a trunnion support unit according to a seventh embodiment of this invention.

FIG. 9 shows a seventh embodiment of this invention wherein the needle bearing 9 is arranged outside the spherical joint 8 which is fitted to the lower end of the trunnion 5.

In this embodiment, the spherical joint 8 fits intimately with the outer circumference of the trunnion 5. Further, a cylindrical member 9B is arranged outside the spherical joint 8 so as to come in contact with the outer circumference of the curved surface of the spherical joint 8.

The needle bearing 9 comes in contact with the inner circumference of a throughole 7A of the link 7. In other words, the engaging hole 7A comes in contact with the outer circumference of the needle bearing 9. At the same time, the needle nearing comes in contact with the outer circumference of the cylindrical member 9B. Hence, the spherical joint 8 is supported such that it is free to rotate in the throughole 7A and the spherical joint 8 can be inclined with a predetermined small range relative to the cylindrical member 9B.

An anvil part 7B which supports the lower end of the cylindrical member 9B is formed at the lower end of the throughole 7A of the link 7. A snap ring 23 is attached to the upper part of the throughole 7A, and a retainer 24 is inserted between the snap ring 23 and the cylindrical member 9B. Up/down displacement of the needle bearing 9 is thus limited by the retainer 24 supported by this snap ring 23 and the anvil part 7B.

In this structure, the inclination of the needle bearing 9 is limited by the cylindrical member 9B of which the upper and lower ends are supported by the retainer 24 and anvil part 7B. Also, the spherical joint 8 comes in contact with the cylindrical member 9B at a substantially identical part regardless of the inclination of the trunnion 5.

Therefore, the needle bearing 9 does not exert an external force in the axial direction on the rotating trunnion 5 even when the needle bearing is inclined relative to the trunnion 5.

This structure may be applied also to the support structure of the upper end of the trunnion 5. Further, if an identical plate spring to those of the aforesaid third and fourth embodiments is interposed between the retainer 24 and snap ring 23, the up/down clearance between the needle bearing 9 and other members is always zero.

Therefore, dimensional, variations due to frictional wear of parts is absorbed, and a screw effect is prevented from acting on the trunnion 5 for a long period of time.

The embodiments of this invention in which an exclusive property or privilege is claimed arc defined as follows:

What is claimed:

1. A trunnion supporting structure of a continuously variable transmission, said transmission comprising an input disk and output disk arranged facing each other on a rotation axis, power rollers for transmitting a torque between said disks, trunnions supporting said power rollers, and a link connecting said trunnions, wherein a gyration angle of the power rollers is varied by driving the trunnions along a trunnion axis at right angles to said rotation axis, said supporting structure comprising:

a spherical joint fitted to the trunnion, a needle bearing disposed between the trunnion and the spherical joint, said needle bearing comprising plural rolling parts which allow relative rotation between the trunnion and the spherical joint, a shoulder part formed in the trunnion, the shoulder part extending at right angles to the trunnion axis, and a member which is fitted to the trunnion and, in cooperation with the shoulder part, prevents the relative displacement of said needle bearing and the trunnion in a direction of said trunnion axis.

2. A supporting structure as defined in claim 1, wherein said spherical joint is fitted in a throughole formed in said link.

3. A supporting structure as defined in claim 1, wherein said member comprises an annular retainer supported via a snap ring fitted to said trunnion.

4. A supporting structure as defined in claim 3, wherein said supporting structure further comprises a spacer filling a gap between said shoulder part and said spherical joint.

5. A supporting structure as defined in claim 4, wherein a contact area between said spacer and said shoulder part is set larger than a contact area between said spacer and said spherical joint.

6. A supporting structure as defined in claim 3, wherein said supporting structure further comprises a spring interposed between said snap ring and said retainer.

7. A supporting structure as defined in claim 1, wherein the member is a nut which screws into said trunnion, and said supporting structure further comprises a thrust needle bearing interposed between said spherical joint and said shoulder part, and a thrust needle bearing interposed between said spherical joint and said nut.

8. A supporting structure as defined in claim 1, wherein said continuously variable transmission comprises a wire for synchronizing the rotation of said plural trunnions, and said member comprises a pulley supported by said trunnion around which said wire is looped.

9. A supporting structure as defined in claim 8, wherein said supporting structure further comprises a spacer filling a gap between said shoulder part and said spherical joint.

10. A supporting structure as defined in claim 9, wherein a contact area between said spacer and said shoulder part is set larger than a contact area between said spacer and said spherical joint.

11. A supporting structure as defined in claim 8 wherein said supporting structure further comprises a spring pushing said pulley towards said spherical joint.

12. A supporting structure as defined in claim 8, wherein said pulley is fixed to said trunnion by a nut, and said supporting structure further comprises a thrust needle bearing interposed between said spherical joint and said shoulder part, and a thurst needle bearing interposed between said spherical joint and said pulley.

13. A trunnion supporting structure of a continuously variable transmission, said transmission comprising an input disk and output disk arranged facing each other on a rotation axis, power rollers for transmitting a torque between said disks, trunnions supporting said power rollers, and a link connecting said trunnions, wherein a gyration angle of the power rollers is varied by driving the trunnions along a trunnion axis at right angles to said rotation axis, said supporting structure comprising:

a spherical joint fitted to the trunnion;

a needle bearing disposed between the trunnion and the spherical joint, said needle bearing comprising plural rolling parts which allow relative rotation between the trunnion and the spherical joint;

a shoulder part formed in the trunnion, the shoulder part extending at right angles to the trunnion axis; and a retainer which is fitted to the trunnion and, in cooperation with the shoulder part, prevents the relative displacement of said needle bearing and the trunnion in a direction of said trunnion axis.

* * * * *